(12) United States Patent
Rauniyar et al.

(10) Patent No.: US 12,347,123 B2
(45) Date of Patent: Jul. 1, 2025

(54) METHOD OF ROBUST SURFACE AND DEPTH ESTIMATION

(71) Applicant: BOSTON SCIENTIFIC SCIMED, INC., Maple Grove, MN (US)

(72) Inventors: Niraj Prasad Rauniyar, Plymouth, MN (US); Robert J. Riker, Sewickley, PA (US); Longquan Chen, Andover, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 372 days.

(21) Appl. No.: 17/940,610

(22) Filed: Sep. 8, 2022

(65) Prior Publication Data
US 2023/0078857 A1 Mar. 16, 2023

Related U.S. Application Data

(60) Provisional application No. 63/242,547, filed on Sep. 10, 2021.

(51) Int. Cl.
*A61B 34/20* (2016.01)
*A61B 34/30* (2016.01)
(Continued)

(52) U.S. Cl.
CPC ............. *G06T 7/521* (2017.01); *G06T 7/40* (2013.01); *G06T 7/73* (2017.01); *G06T 2207/10068* (2013.01); *G06T 2207/30084* (2013.01)

(58) Field of Classification Search
USPC ......... 128/897–899, 920, 922–925; 382/106, 382/128–132, 154–159, 181–195;
(Continued)

(56) References Cited

U.S. PATENT DOCUMENTS

| | | | |
|---|---|---|---|
| 5,475,420 A | 12/1995 | Buchin | |
| 8,928,734 B2 * | 1/2015 | Dai | ........................ G06T 7/586 |
| | | | 348/46 |

(Continued)

FOREIGN PATENT DOCUMENTS

| | | |
|---|---|---|
| EP | 2174297 A1 | 4/2010 |
| JP | 2008264539 A | 11/2008 |
| JP | 2010532035 A | 9/2010 |

OTHER PUBLICATIONS

Veys Charles; Apparatus and Method for Determining Spectral Information; 2019 (Year: 2019).*

(Continued)

*Primary Examiner* — Marcellus J Augustin
(74) *Attorney, Agent, or Firm* — Seager, Tufte & Wickhem, LLP (57) ABSTRACT

Systems and methods related to estimating the distance of a body structure from a medical device are disclosed. An example method includes illuminating the body structure with a light source of a medical device, capturing a first input image of the body structure with a digital camera positioned on the medical device, representing the first image with a first plurality of pixels, wherein the first plurality of pixels includes one or more pixels displaying a local intensity maxima, defining a first pixel group from the one or more pixels displaying a local intensity maxima, wherein the first pixel group corresponds to a plurality of surface points of the body structure and wherein the first pixel group further includes a first image intensity. The method further includes calculating a relative distance from the digital camera to a first surface point of the plurality of surface points.

20 Claims, 7 Drawing Sheets

(51) Int. Cl.
  *G06T 7/40* (2017.01)
  *G06T 7/521* (2017.01)
  *G06T 7/73* (2017.01)

(58) Field of Classification Search
  USPC .................................................. 702/150–158
  See application file for complete search history.

(56) References Cited

U.S. PATENT DOCUMENTS

| | | | |
|---|---|---|---|
| 10,022,074 | B2 | 7/2018 | Shigeta |
| 10,031,070 | B2 | 7/2018 | Chiba |
| 10,051,193 | B2 | 8/2018 | Kagawa et al. |
| 10,092,192 | B2 | 10/2018 | Lashkari et al. |
| 10,123,684 | B2 | 11/2018 | Sidar et al. |
| 10,198,872 | B2 * | 2/2019 | Lurie .................. G06T 19/20 |
| 10,231,600 | B2 | 3/2019 | Ikemoto et al. |
| 10,617,282 | B2 | 4/2020 | Kuriyama |
| 10,722,105 | B2 | 7/2020 | Kobayashi et al. |
| 10,729,310 | B2 | 8/2020 | Takahashi |
| 10,765,295 | B2 | 9/2020 | Takahashi |
| 2005/0145798 | A1 * | 7/2005 | Stark .................... A61B 5/1077 |
| | | | 250/363.08 |
| 2011/0019035 | A1 | 1/2011 | Satodate |
| 2011/0028183 | A1 * | 2/2011 | Yun ........................ G06T 7/593 |
| | | | 348/46 |
| 2012/0220840 | A1 | 8/2012 | Morita et al. |
| 2015/0363942 | A1 | 12/2015 | Mitsui |
| 2020/0184665 | A1 * | 6/2020 | Ikemoto ................. H04N 23/56 |

OTHER PUBLICATIONS

Siessegger Bernhard; Surface Reconstruction of an Illuminated Object Through Photometric Stereo Analysis; 2019 (Year: 2019).*
Wang, Fei; A Monocular Three-dimensional Visual Camera-based Three-dimensional Reconstruction System; 2018 (Year: 2018).*
Wang Kang-Huai; Reconstruction of Images From an In Vivo Multi-Camera Capsule; 2014 (Year: 2014).*
Venkatesan Shankar Mosur; Imaging a Patient's Interior; 2014 (Year: 2014).*
A Monocular Three-dimensional Visual Camera-based Three-dimensional Reconstruction System (Year: 2018).*
Surface Reconstruction of an Illuminated Object Through Photometric Stereo Analysis (Year: 2019).*
Imaging a Patient's Interior (Year: 2014).*
Reconstruction of Images From an In Vivo Multi-Camera Capsule (Year: 2014).*
Apparatus and Method for Determining Spectral Information (Year: 2019).*
International Search Report and Written Opinion dated Dec. 6, 2022 for International Application No. PCT/US2022/042901.
Shen et al., "Robust Camera Localisation with Depth Reconstruction for Bronchoscopic Navigation", Int J Cars, 10:801-813, 2015.

* cited by examiner

METHOD OF ROBUST SURFACE AND DEPTH ESTIMATION

CROSS REFERENCE TO RELATED APPLICATIONS

This application claims the benefit of and priority to U.S. Provisional patent application Ser. No. 63/242,547 filed on Sep. 10, 2021, the disclosure of which is incorporated herein by reference.

TECHNICAL FIELD

The present disclosure relates to image processing techniques and more particularly, reconstructing multiple images captured during a medical procedure, whereby the process of registering and reconstructing an imaged scene utilizes unique features of the scene to accurately display the captured image while minimizing computational requirements.

BACKGROUND

Various medical device technologies are available to medical professionals for use in viewing and imaging internal organs and systems of the human body. For example, a medical endoscope equipped with a digital camera may be used by physicians in many fields of medicine in order to view parts of the human body internally for examination, diagnosis, and during treatment. For example, a physician may utilize a digital camera coupled to an endoscope to view the treatment of a kidney stone during a lithotripsy procedure.

During a lithotripsy procedure, a physician may view a live video stream captured by a digital camera positioned adjacent to a laser fiber being used to pulverize a kidney stone. It can be appreciated that to assure the medical procedure is performed in an efficient manner, the physician (or other operator) needs to visualize the kidney stone in an appropriate field of view. For example, the images captured by the digital camera positioned adjacent the kidney stone need to accurately reflect the size of the kidney stone. Knowing the physical size of a kidney stone (and/or residual stone fragments) may directly impact procedural decision making and overall procedural efficiency. In some optical imaging systems (e.g., monocular optical imaging systems), the image sensor pixel size may be fixed, and therefore, the physical size of the objects being displayed depends on the distance of the object from the collection optic. In such instances, two objects of identical size may appear to be different in the same image, whereby the object further from the optic may appear smaller than the second object. Therefore, when analyzing video imagery in a medical procedure, it may be useful to accumulate data from multiple image frames, which may include changes to the image "scene" in addition to changes in the camera viewpoint. This accumulated data may be used to reconstruct a three-dimensional representation of the imaged area (e.g., the size and volume of a kidney stone or other anatomical feature). Therefore, it may be desirable to develop image processing algorithms which register video frames and reconstruct the imaged environment, thereby improving the clarity and accuracy of the visual field observed by a physician during a medical procedure. Image processing algorithms which utilize image registering and reconstruction techniques (while minimizing computational processing requirements) to enhance multi-exposure images are disclosed.

BRIEF SUMMARY

This disclosure provides design, material, manufacturing method, and use alternatives for medical devices. An example method of estimating the distance of a body structure from a medical device includes illuminating the body structure with a light source positioned on the distal end region of a medical device, capturing a first input image of the body structure with a digital camera positioned on the distal end region of the medical device, representing the first image with a first plurality of pixels, wherein the first plurality of pixels includes one or more pixels displaying a local intensity maxima, defining a first pixel group from the one or more pixels displaying a local intensity maxima, wherein the first pixel group corresponds to a plurality of surface points of the body structure and wherein the first pixel group further includes a first image intensity. The method further includes calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:
I is an image intensity;
L is an illumination intensity;
A is a surface albedo factor;
$\vec{v}$ is a vector from the first surface point to the camera;
$\vec{S}$ is a vector normal to the first surface point; and
r is the distance from the digital camera to the first surface point.

Alternatively or additionally to any of the embodiments above, further comprising calculating the relative distances from the digital camera to each of the surface points of the plurality of surface points.

Alternatively or additionally to any of the embodiments above, further comprising calculating a refined surface albedo factor using the relative distances from the digital camera to each of the surface points and a pixel intensity average over pixels with a similar hue.

Alternatively or additionally to any of the embodiments above, further comprising calculating refined relative distances from the digital camera to each of the surface points using the refined surface albedo factor.

Alternatively or additionally to any of the embodiments above, wherein the refined distances and the refined surface albedo factor are constrained by a map of three-dimensional position uncertainty vectors derived from one or more registered frames.

Alternatively or additionally to any of the embodiments above, further comprising calculating a second surface point position from a weighted average of the refined distance values, the refined surface albedo factor and a previous estimate of the second surface point position.

Alternatively or additionally to any of the embodiments above, wherein the weighted average of the refined distance values, the refined surface albedo factor and the previous estimate of the second surface point position is inversely proportional to the magnitude of an uncertainty vector.

Alternatively or additionally to any of the embodiments above, further comprising calculating an uncertainty vector $\vec{U}_p$, weighted averages and positions according to the relations:

$$w_p = \frac{U_m}{U_m + |\vec{U}_p|}, w_m = \frac{|\vec{U}_p|}{U_m + |\vec{U}_p|}, \vec{p}' = w_p\vec{p} + w_m\vec{m}$$

wherein:
$w_p$=a weighted average of previous distance values;
$w_m$=a weighted average of a new measurement node coordinate;
$\vec{p}$ =a previous model node coordinate;
$\vec{p}'$ =an updated model node coordinate;
$U_m$=a new model node uncertainty measurement;
$\vec{U}_p$ =a previous model node uncertainty vector; and
$\vec{m}$ =a new measurement node coordinate.

Alternatively or additionally to any of the embodiments above, further comprising generating a surface texture map associated with the surface position map, wherein the surface texture map is generated using the relation:

$$|\vec{U}_p| = \frac{w_m \vec{U}_p + w_p \hat{v}}{w_p + w_m} \sqrt{U_m^2 + |\vec{U}_p|^2}$$

Another method of estimating the distance of a body structure from a medical device includes illuminating the body structure with a light source positioned on the distal end region of the medical device, using a digital camera positioned on the distal end of region of the medical device to capture a first image of the body structure at a first time point, wherein the image capture device is positioned at a first position when it captures the first image at the first time point, representing the first image with a first plurality of pixels, wherein the first plurality of pixels includes one or more pixels displaying a local intensity maxima, defining a first pixel group from the one or more pixels displaying a local intensity maxima, wherein the first pixel group corresponds to a plurality of surface points of the body structure, wherein the first pixel group further includes a first image intensity; and calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:
I is an image intensity;
L is an illumination intensity;
A is a surface albedo factor;
$\vec{v}$ is a vector from the first surface point to the camera;
$\vec{S}$ is a vector normal to the first surface point; and
r is the distance from the digital camera to the first surface point.

Alternatively or additionally to any of the embodiments above, further comprising calculating the relative distances from the digital camera to each of the surface points of the plurality of surface points.

Alternatively or additionally to any of the embodiments above, further comprising calculating a refined surface albedo factor using the relative distances from the digital camera to each of the surface points and a pixel intensity average over pixels with a similar hue.

Alternatively or additionally to any of the embodiments above, further comprising calculating refined relative distances from the digital camera to each of the surface points using the refined surface albedo factor.

Alternatively or additionally to any of the embodiments above, wherein the refined distances and the refined surface albedo factor are constrained by a map of three-dimensional position uncertainty vectors derived from one or more registered frames.

Alternatively or additionally to any of the embodiments above, further comprising calculating a second surface point position from a weighted average of the refined distance values, the refined surface albedo factor and a previous estimate of the second surface point position.

Alternatively or additionally to any of the embodiments above, wherein the weighted average of the refined distance values, the refined surface albedo factor and the previous estimate of the second surface point position is inversely proportional to the magnitude of an uncertainty vector.

Alternatively or additionally to any of the embodiments above, further comprising calculating an uncertainty vector $\vec{U}_p$, weighted averages and positions according to the relations:

$$w_p = \frac{U_m}{U_m + |\vec{U}_p|}, w_m = \frac{|\vec{U}_p|}{U_m + |\vec{U}_p|}, \vec{p}' = w_p\vec{p} + w_m\vec{m}$$

wherein:
$w_p$=a weighted average of previous distance values;
$w_m$=a weighted average of a new measurement node coordinate;
$\vec{p}$ =a previous model node coordinate;
$\vec{p}'$ =an updated model node coordinate;
$U_m$=a new model node uncertainty measurement;
$\vec{U}_p$ =a previous model node uncertainty vector; and
$\vec{m}$ =a new measurement node coordinate.

Alternatively or additionally to any of the embodiments above, further comprising generating a surface texture map associated with the surface position map, wherein the surface texture map is generated using the relation:

$$|\vec{U}_p| = \frac{w_m \vec{U}_p + w_p \hat{v}}{w_p + w_m} \sqrt{U_m^2 + |\vec{U}_p|^2}$$

An example system for estimating the distance of a body structure from a medical device includes a processor and a non-transitory computer-readable storage medium comprising code configured to perform a method for estimating the distance of a body structure from a medical device. The method for estimating the distance of a body structure from a medical device includes illuminating the body structure with a light source positioned on the distal end region of a medical device, capturing a first input image of the body structure with a digital camera positioned on the distal end region of the medical device, representing the first image with a first plurality of pixels, wherein the first plurality of pixels includes one or more pixels displaying a local intensity maxima, defining a first pixel group from the one or more pixels displaying a local intensity maxima, wherein the first pixel group corresponds to a plurality of surface points of the body structure, wherein the first pixel group further includes a first image intensity. The method further includes calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:
I is an image intensity;
L is an illumination intensity;
A is a surface albedo factor;
$\vec{v}$ is a vector from the first surface point to the camera;
$\vec{S}$ is a vector normal to the first surface point; and
r is the distance from the digital camera to the first surface point.

Alternatively or additionally to any of the embodiments above, further comprising calculating the relative distances from the digital camera to each of the surface points of the plurality of surface points.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g． 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the disclosure.

Image processing methods performed on images collected via a medical device (e.g., an endoscope) during a medical procedure are described herein. Further, the image processing methods described herein may include image registration and reconstruction algorithms. Various embodiments are disclosed for generating an improved image registration and reconstruction method that accurately reconstructs a three-dimensional image of an imaged area, while minimizing computational processing requirements. Specifically, various embodiments are directed to utilizing illumination data to provide information about image scene depths and surface orientations. For example, methods disclosed herein may use algorithms to extract vessel central axis locations and utilize chamfer matching techniques to optimize the registration process between two or more images. Further, because the medical device collecting the images (e.g., an endoscope) shifts positions while collecting images (over the time period of a medical procedure), the degrees of freedom (DOF) inherent to the motion of the endoscope may be leveraged to improve the optimization process of the registration algorithm. For example, image processing algorithms disclosed herein may utilize data representing the movement of the camera over a time period, whereby the data representing the positional change of the camera may be utilized to reconstruct a three-dimensional depiction of the imaged scene.

During a medical procedure (e.g., a ureteroscopic procedure), accurate representations of the depth perception of a digital image is important for procedural efficiency. For example, having an accurate representation of objects within the imaged field of view (e.g., the size of kidney stone within a displayed image) is critical for procedural decision making. Further, the size estimation via digital imaging is directly related to depth estimations. For example, the image obtained from a digital sensor is only two-dimensional in nature. To obtain an accurate volume estimation and/or an accurate scene reconstruction, the collected images may need to be evaluated from multiple viewpoints. Further, after collecting multiple images from various viewpoints (including positional changes of the camera), multiple image frames may be registered together to generate a three-dimensional depiction of the anatomical scene. It can be appreciated that the process of registering multiple image frames together may be complicated by motion of a patient's anatomy, as well as the inherent motion of an operator (e.g., a physician) which is operating the image collection device (e.g., digital camera positioned within the patient). As discussed above, understanding the movement of the camera from frame to frame may provide an accurate depth estimation for each pixel utilized to represent the three-dimensional scene.

With any imaging system, to accurately interpret the image, it may be important for an operator (e.g., a physician) to know the actual physical size of an object being displayed. For stereoscopic optical imaging systems which include multiple imaging sensors in a fixed relative position this is achieved by calibrating the optical parameters of the system (e.g., focus length, distance between sensors and distortion), registering features of the images from the sensors, and using that information to compute distance from the imaging system for each pixel, which in turn permit calculation of pixel size (which may be frequently displayed using scale bars). However, this may not be possible in "monocular" optical imaging systems that image a three-dimensional scene with significant depth. In these systems, while the image sensor pixel size may be fixed, the physical size of the object being displayed will depend on the distance of that object from the collection optics (e.g., the distance of the object from the distal end of an endoscope). For example, in some optical imaging systems, two objects of identical size may appear to be different in the image, whereby the object further from the collection optic may appear smaller than an object closer to the collection optic. Therefore, when analyzing video imagery it may be beneficial to collect data from multiple image frames, which may include changes to the imaged scenes as well as changes in the camera viewpoint.

In some imaging systems, the size of the field of view is estimated by comparing an object of unknown size to an object of known size. For example, during a lithotripsy procedure, the size of the field of view may be estimated by comparing the size of a laser fiber to that of a kidney stone. However, it may take a significant amount of time for physicians to develop the ability to make the comparative estimations. Further, for endoscopic imaging systems, in particular, this methodology is inherently limited because endoscopes are relatively small, and therefore, may include cameras that (1) use a single objective lens, and (2) rely on fixed focal length optics. These limitations result in imaging configurations having variable magnification of the object over the scene, whereby each pixel detected by the camera's sensor may represent a different physical size on the object.

As discussed above, when analyzing video imagery it may be useful to accumulate data from multiple image frames (which may include changes to the imaged scene) and/or changes in the camera viewpoint. For example, a camera position change between two frames may permit relative depth measurements of scene objects to be made if the pixels corresponding to those objects' features are identified in both frames. While the mapping of corresponding pixels in two images is very useful, it is often difficult and computationally complex to do for a significant number of image features.

However, while collecting images with a relatively small medical device (such as an endoscope) may present challenges, endoscopic imaging may also provide unique advantages that may be leveraged for efficient multiple image registration. For example, because an endoscopic scene (e.g., collecting images of a kidney stone within a kidney) is generally lit by a single light source with a known and fixed relationship to the camera, illumination data may provide an additional source of information about image depths and surface orientations.

Figure 1:
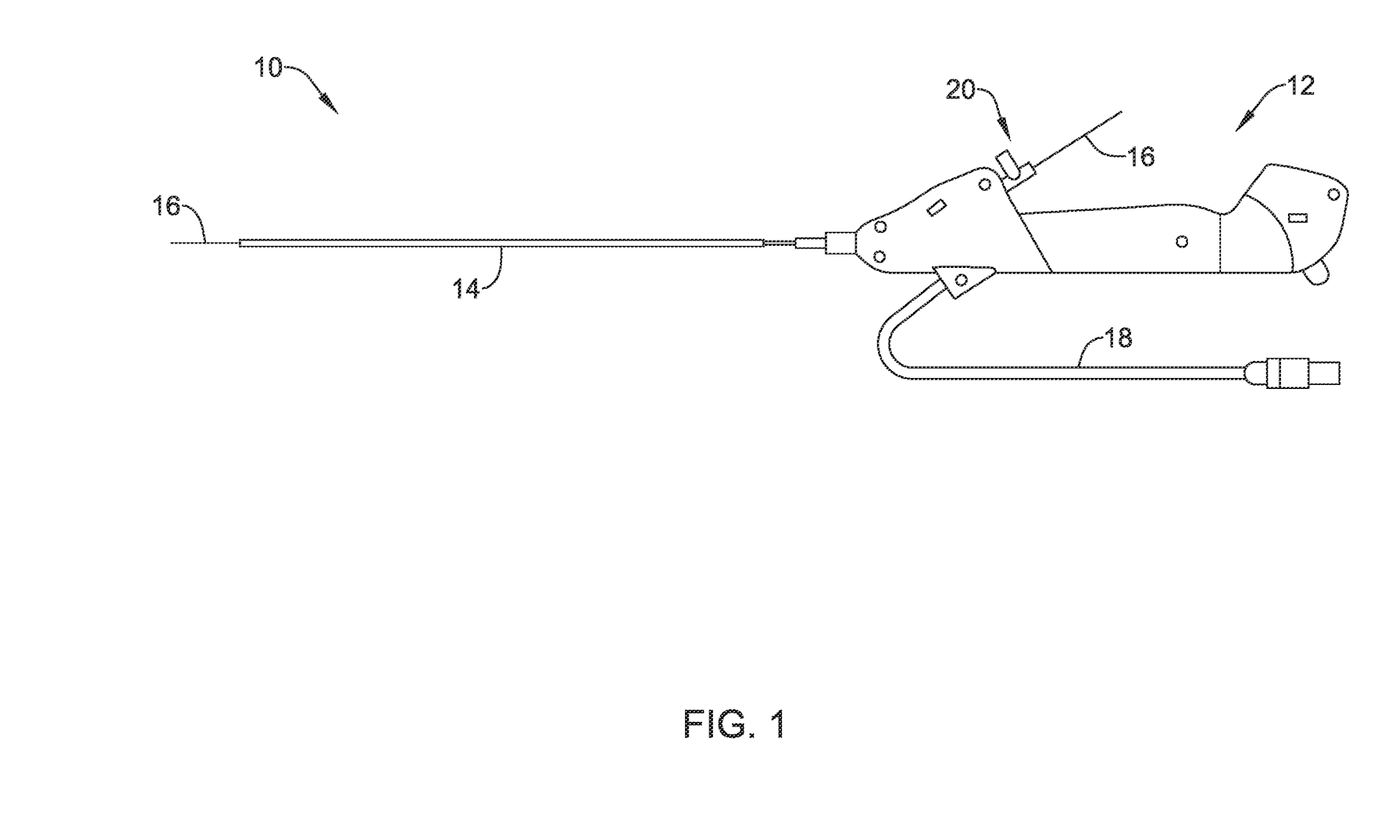
FIG. 1 is a schematic illustration of an example endoscopic system.

A description of a system for combining multi-exposure images to register and reconstruct multiple images is described below. FIG. 1 illustrates an example endoscopic system that may be used in conjunction with other aspects of the disclosure. In some embodiments, the endoscopic system may include an endoscope 10. The endoscope 10 may be specific to a particular endoscopic procedure, such as, e.g., ureteroscopy, lithotripsy, etc. or may be a general-purpose device suitable for a wide variety of procedures. In some embodiments, the endoscope 10 may include a handle 12 and an elongate shaft 14 extending distally therefrom, wherein the handle 12 includes a port configured to receive a laser fiber 16 extending within the elongate shaft 14. As illustrated in FIG. 1, the laser fiber 16 may be passed into a working channel of the elongate shaft 14 through a connector 20 (e.g., a Y-connector) or other port positioned along the distal region of the handle 12. It can be appreciated that the laser fiber 16 may deliver laser energy to a target site within the body. For example, during a lithotripsy procedure, the laser fiber 16 may deliver laser energy to pulverize a kidney stone.

Additionally, the endoscopic system shown in FIG. 1 may include a camera and/or lens positioned at the distal end of the elongate shaft 14. The elongate shaft and/or camera/lens may have deflection and/or articulation capabilities in one or more directions for viewing patient anatomy. In some embodiments, the endoscope 10 may be a ureteroscope. However, other medical devices, such as a different endoscope or related system, may be used in addition to or in place of a ureteroscope. Further, in some embodiments, the endoscope 10 may be configured to deliver fluid from a fluid management system to a treatment site via the elongate shaft 14. The elongate shaft 14 may include one or more working lumens for receiving a flow of fluid and/or other medical devices therethrough. In some embodiments, the endoscope 10 may be connected to the fluid management system via one or more supply lines.

In some embodiments, the handle 12 of the endoscope 10 may include a plurality of elements configured to facilitate the endoscopic procedure. In some embodiments, a cable 18 may extend from the handle 12 and is configured for attachment to an electronic device (e.g., a computer system, a console, a microcontroller, etc.) for providing power, analyzing endoscopic data, controlling the endoscopic intervention, or performing other functions. In some embodiments, the electronic device to which the cable 18 is connected may have functionality for recognizing and exchanging data with other endoscopic accessories.

In some embodiments, image signals may be transmitted from the camera at the distal end of the endoscope through the cable 18 to be displayed on a monitor. For example, as described above, the endoscopic system shown in FIG. 1 may include at least one camera to provide a visual feed to the user on the display screen of a computer workstation. It can be appreciated that, while not explicitly shown, the elongate shaft 14 may include one or more working lumens within which a data transmission cable (e.g., fiber optic cable, optic cable, connector, wire, etc.) may extend. The data transmission cable may be connected to the camera described above. Further, the data transmission cable may be coupled to the cable 18. Further yet, the cable 18 may be coupled to the computer processing system and display screen. Images collected by the camera may be transmitted through a data transmission cable positioned within the elongate shaft 14, whereby the image data then passes through the cable 18 to the computer processing workstation.

In some embodiments, the workstation may include a touch panel computer, an interface box for receiving the wired connection (e.g., the cable 18), a cart, and a power supply, among other features. In some embodiments, the interface box may be configured with a wired or wireless communication connection with the controller of the fluid management system. The touch panel computer may include at least a display screen and an image processor, and in some embodiments, may include and/or define a user interface. In some embodiments, the workstation may be a multi-use component (e.g., used for more than one procedure) while the endoscope 10 may be a single use device, although this is not required. In some embodiments, the workstation may be omitted and the endoscope 10 may be electronically coupled directly to the controller of the fluid management system.

Figure 2:
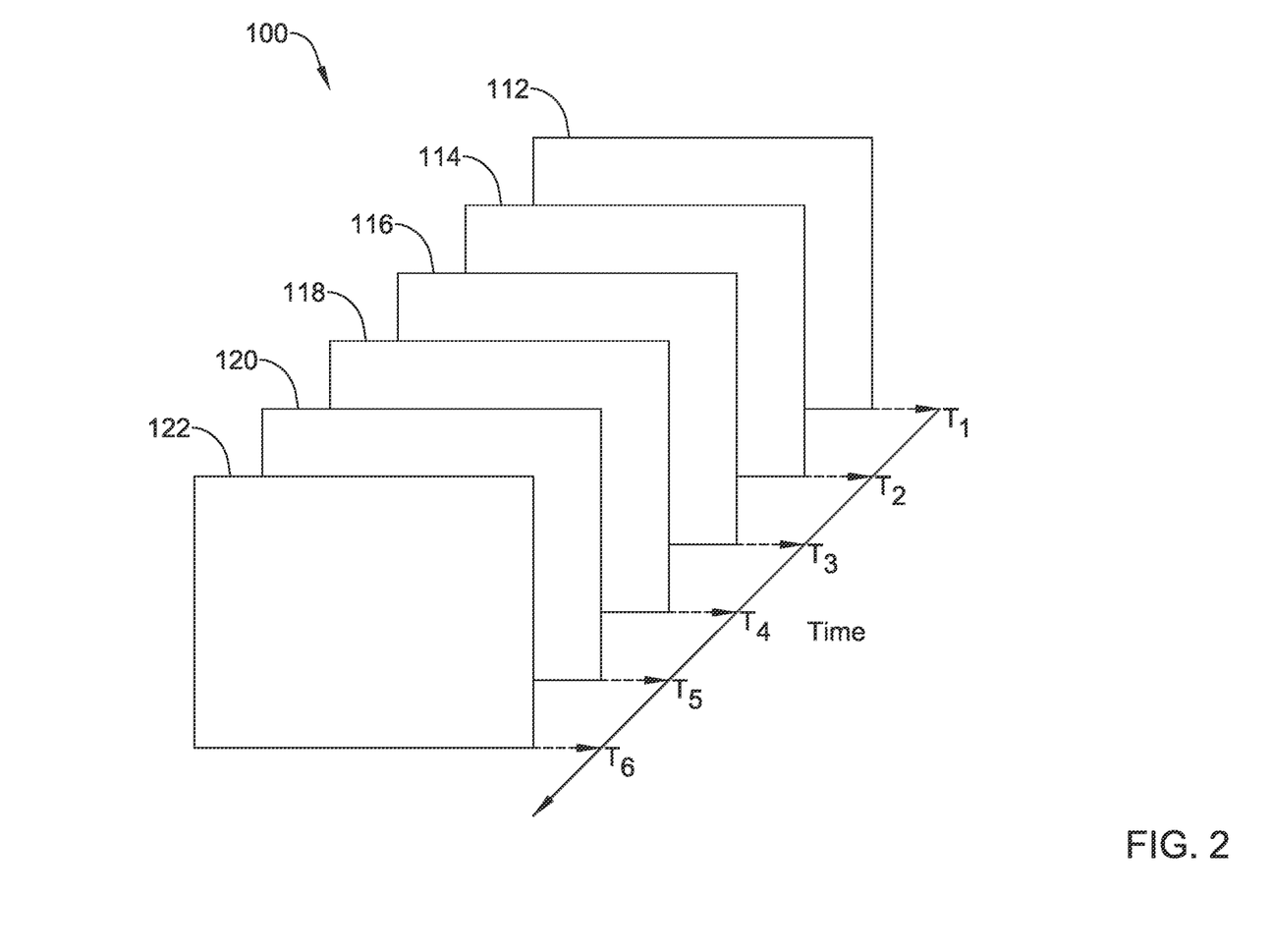
FIG. 2 illustrates a sequence of images collected by digital camera over a time period.

FIG. 2 illustrates a plurality of images 100 captured in sequence by a camera over a time period. It can be appreciated that the images 100 may represent a sequence of images captured during a medical procedure. For example, the images 100 may represent a sequence of images captured during a lithotripsy procedure in which a physician utilizes a laser fiber to treat a kidney stone.

It can be further appreciated that the images 100 may be collected by an image processing system which may include, for example, a computer workstation, laptop, a tablet, or other computing platform that includes a display through which a physician may visualize the procedure in real-time. During the real-time collection of images 100, the image processing system may be designed to process and/or enhance a given image based on the fusion of one or multiple images taken subsequent to a given image. The enhanced images may then be visualized by the physician during the procedure.

As discussed above, it can be appreciated that the images 100 illustrated in FIG. 2 may include images captured with an endoscopic device (i.e. an endoscope) during a medical procedure (e.g., during a lithotripsy procedure). Further, it can be appreciated that the images 100 illustrated in FIG. 2 may represent a sequence of images 100 captured over time. For example, the image 112 may represent an image captured at time point $T_1$, while the image 114 may represent an image captured at time point $T_2$, whereby the image 114 captured at time point $T_2$ occurs after the image 112 captured at time point $T_1$. Further, the image 116 may represent an image captured at time point $T_3$, whereby the image 116 captured time point $T_3$ occurs after the image 114 captured at time point $T_2$. This sequence may progress for the images 118, 120 and 122 taken at time points $T_4$, $T_5$ and $T_6$, respectively, where time point $T_4$ occurs after time point $T_5$, time point $T_5$ occurs after time point $T_4$, and time point $T_6$ occurs after time point $T_5$.

It can further be appreciated that the images 100 may be captured by a camera of an endoscopic device positioned during a live event. For example, the images 100 may be captured by a digital camera positioned within a body vessel during a medical procedure. Therefore, it can further be appreciated that while the camera's field of view remains constant during the procedure, the images that are generated during the procedure may change due to the dynamic nature of the procedure being captured by the images. For example, the image 112 may represent an image taken at a time point just before a laser fiber emits laser energy to pulverize a kidney stone. Further, the image 114 may represent an image taken at a time point just after a laser fiber emits laser energy to pulverize the kidney stone. It can further be appreciated that after the laser imparts energy to the kidney stone, various particles from the kidney stone may move quickly through the camera's field of view. Additionally, it can be appreciated that over the time period in which the camera collects the images 100, the position of the camera may change (while collecting the images 100). As discussed herein, the positional change of the camera may provide data which may contribute to generating accurate three-dimensional reconstructed image scenes.

It can be appreciated that a digital image (such as any one of the plurality of images 100 shown in FIG. 1) may be represented as a collection of pixels (or individual picture elements) arranged in a 2-dimensional grid, represented using squares. Further, each individual pixel making up an image may be defined as the smallest item of information in the image. Each pixel is a small sample of the original image, where more samples typically provide more-accurate representations of the original.

Figure 3:
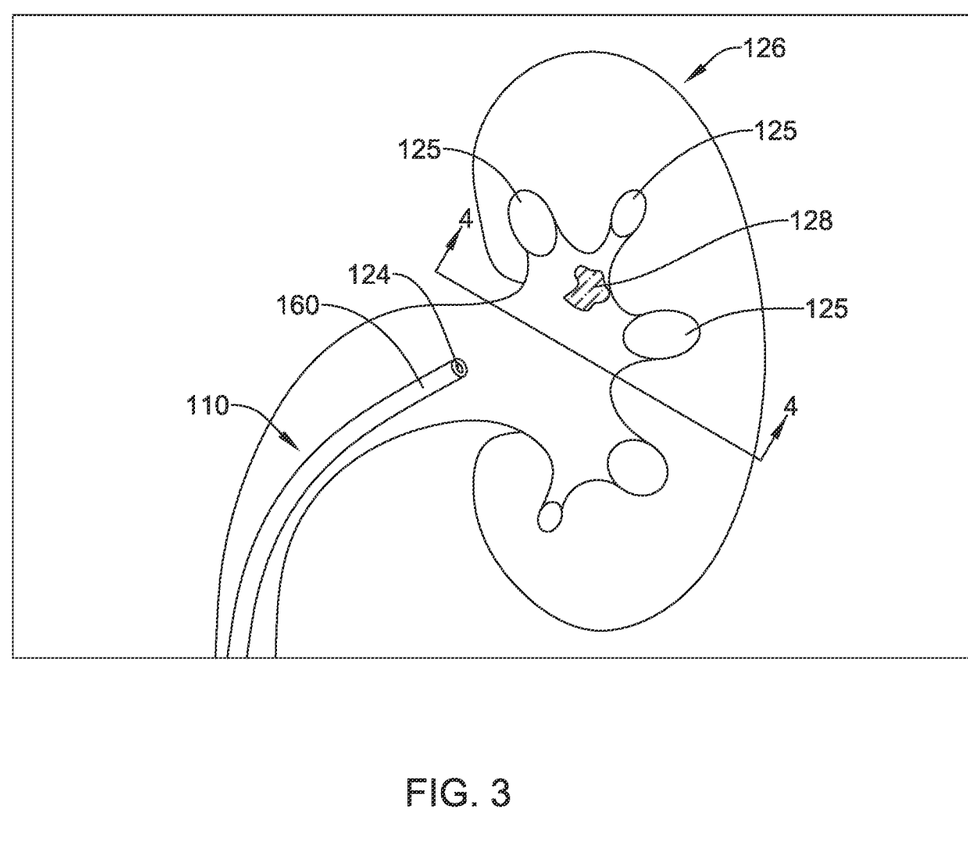
FIG. 3 illustrates an example optical imaging system capturing an image in an example medical procedure.

FIG. 3 illustrates an example endoscope 110 positioned within a kidney 129. It can be appreciated that while FIG. 3 and the related discussion may be directed to images taken within the kidney, the techniques, algorithms and/or methodologies disclosed herein may be applied to images collected and processed in any body structure (e.g., body lumens, cavities, organs, etc.)

The example endoscope 110 illustrated in FIG. 3 may be similar in form and function to the endoscope 10 described above with respect to FIG. 1. For example, FIG. 3 illustrates the distal end region of the elongate shaft 160 of the endoscope 110 may include a digital camera 124. As described above, the digital camera 124 may be utilized to capture images of an object positioned in the example kidney 129. In particular, FIG. 3 illustrates a kidney stone 128 positioned downstream (within the kidney 129) of the distal end region of the elongate shaft 160 of the endoscope 110. Accordingly, the camera 124 positioned on the distal end region of the shaft 160 may be utilized to capture images of the kidney stone 128 as a physician performs a medical procedure (such as a lithotripsy procedure to break up the kidney stone 128). Additionally, FIG. 3 illustrates one or more calyx (cuplike extensions) distributed within the kidney 129.

Additionally, it can be appreciated that as the physician manipulates the endoscope 110 while performing the medical procedure, the digital camera 124, the kidney 129 and/or the kidney stone 128 may shift positions as the digital camera 124 captures images over a time period. Accordingly, images captured by the camera 124 over time may vary slightly relative to one another.

Figure 4A:
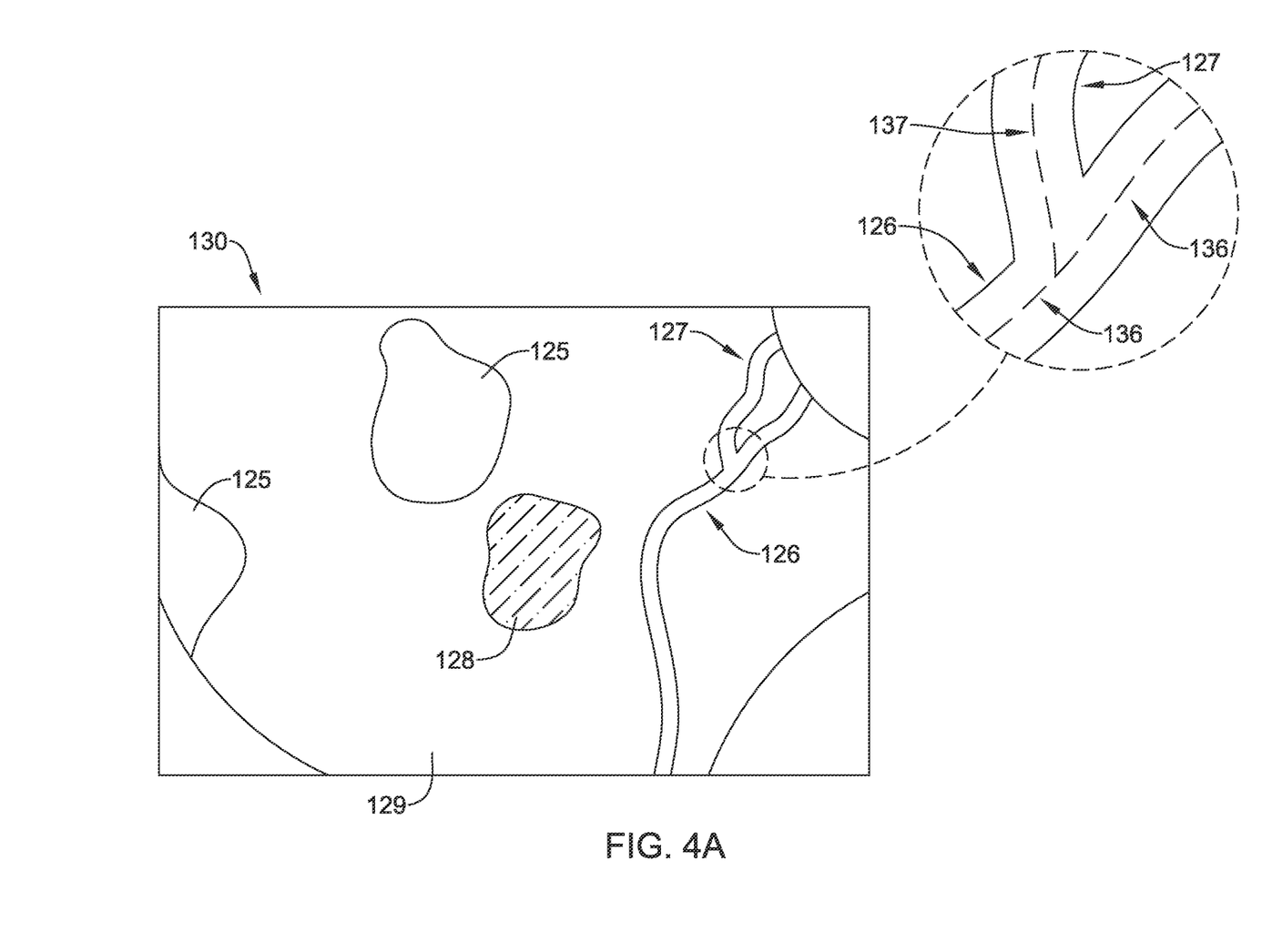
FIG. 4A illustrates a first image captured by the example optical imaging system of FIG. 3 at a first time point.
Figure 4B:
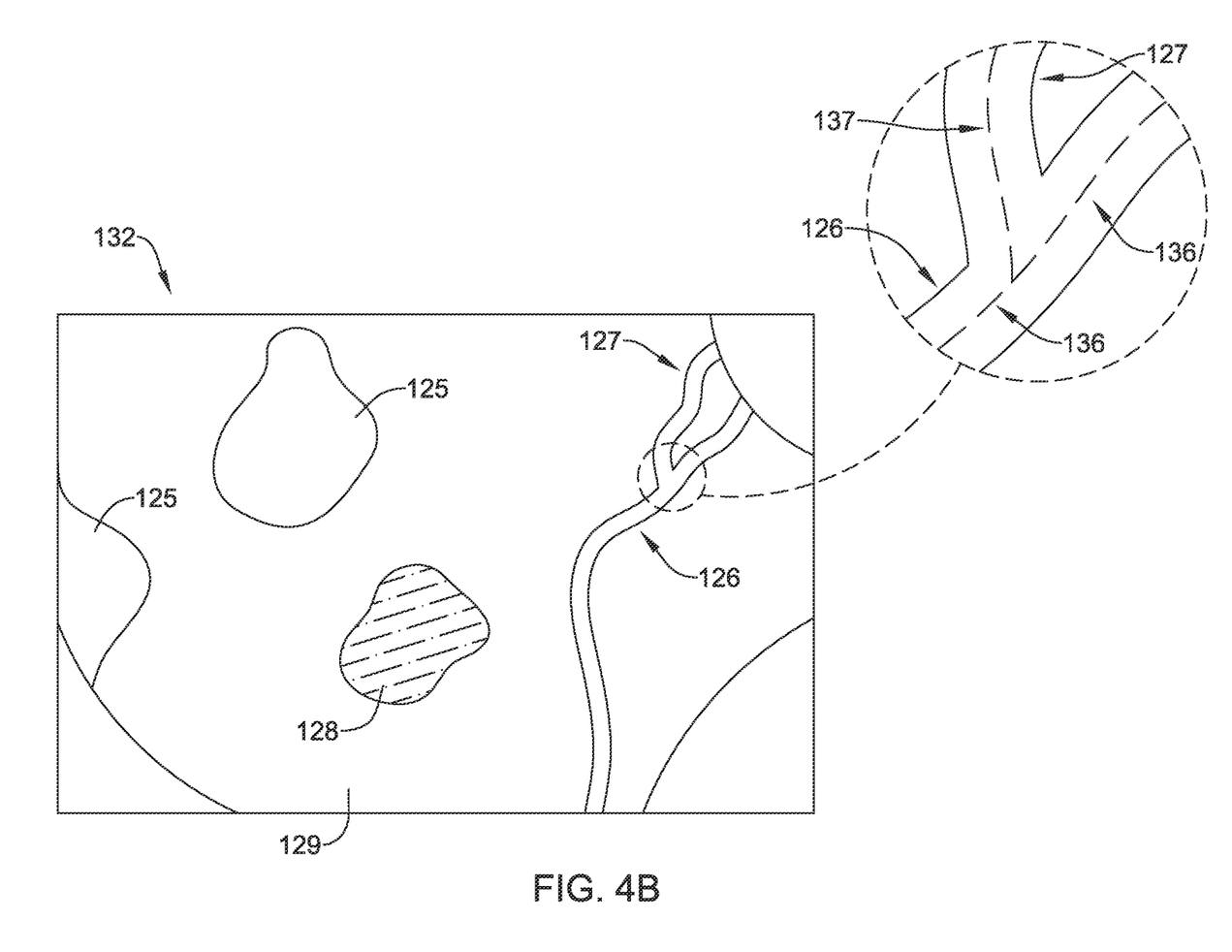
FIG. 4B illustrates a second image captured by the example optical imaging system of FIG. 3 at a second time point.

FIG. 4A illustrates a first image 130 taken by the digital camera 124 of the endoscope 110 along the line 4-4 of FIG. 3. It can be appreciated that the image 130 shown in FIG. 4A illustrates a cross-sectional image of the cavity of the kidney 129 taken along line 4-4 of FIG. 3. Accordingly, FIG. 4A illustrates the kidney stone 128 positioned within an inner cavity of the kidney 129 at a first time point. Further, FIG. 4B illustrates a second image 132 taken after the first image 130. In other words, FIG. 4B illustrates a second image 132 taken at a second time point which occurs after the first time point (the first time point corresponding to the time point at which image 130 was taken). It can be appreciated that during the time lapse between the first time point and the second time point, the position of the digital camera 124 may have changed. Accordingly, it can be appreciated that the change in position of the digital camera 124 is reflected in the differences between the first image 130 taken at the first time point and the second image 132 taken at the later time point.

The detailed view of FIG. 4A further illustrates that the kidney 129 may include a first blood vessel 126 including a central longitudinal axis 136. The blood vessel 126 may be adjacent to the kidney stone 128 and be visible on a surface of the inner cavity of the kidney 129. It can be appreciated that the central longitudinal axis 136 may represent the approximate central location of the cross-section of the blood vessel 126 (taken at any point along the length of the vessel 126). For example, as shown in FIG. 4A, the dashed line 136 is shown following the central longitudinal axis of the blood vessel 126. Further, FIG. 4A illustrates another example blood vessel 127 branching off the blood vessel 136, whereby the blood vessel 127 includes a central longitudinal axis 137.

It can be further appreciated that to generate an accurate, real-time representation of the position and size of the kidney stone 128 within the cavity of the kidney 129, a "hybrid" image may need to be constructed using data from both the first image 130 and the second image 132. In particular, the first image 130 may be registered with the second image 132 to reconstruct a hybrid image which accurately represents the position and size of the kidney stone 128 (or other structures) within the kidney 129. An example methodology to generate a hybrid image which accurately represents the position and size of the kidney stone 128 within the kidney 129 is provided below. Additionally, as will be described herein, the hybrid image generation may represent one step in the generation of an accurate three-dimensional reconstruction of the imaged scenes represented in FIGS. 4A and 4B. For example, the hybrid image may be utilized with the positional change data of the medical device 110 to generate a three-dimensional depiction of the image scenes.

Estimating Tissue Depth from Object Intensity

As discussed herein, accurate estimations of imaged tissue depth and surface geometry are important when reconstructing an imaged environment (and thereby improving the clarity and accuracy of the visual field observed by a physician during a medical procedure). For example, determining the positional change (e.g., change in depth from an imaged body structure) of the medical device 110 from a body structure as the medical device 110 shifts positions while capturing sequential images may be utilized in one or more algorithms to generate an improved three-dimensional depiction of the image scene. This section describes a modified Lambertian model which may be utilized to estimate tissue depth from the intensity of an object.

The modified Lambertian model described herein assumes that the light source illuminating an object (e.g., a body structure), is effectively collocated with a digital camera (e.g., the light source and the digital camera are positioned side by side on the distal end of an endoscope). It can be appreciated that traditional algorithms may generally include a Lambertian reflectance model, which may assume that a light source is infinitely removed from an illuminated body structure, and therefore, the light source may effectively illuminate near and far elements of the scene consistently with parallel rays. However, in the examples disclosed herein, the surface reflectance may correlate with the dot product of the camera ray and surface normal, in addition to a quartic function of the surface distance from the camera. Further, as will be discussed below, assumptions regarding the lighting intensity, surface albedo and minimal interreflectance may permit the direct calculation of depth and orientation at singular points. Additionally, smoothness constraints, geometric heuristics (e.g., an assumption of a generally concave body structure) may permit the creation of an internally consistent model of an object's (e.g., a body structure) surface geometry.

Figure 5:
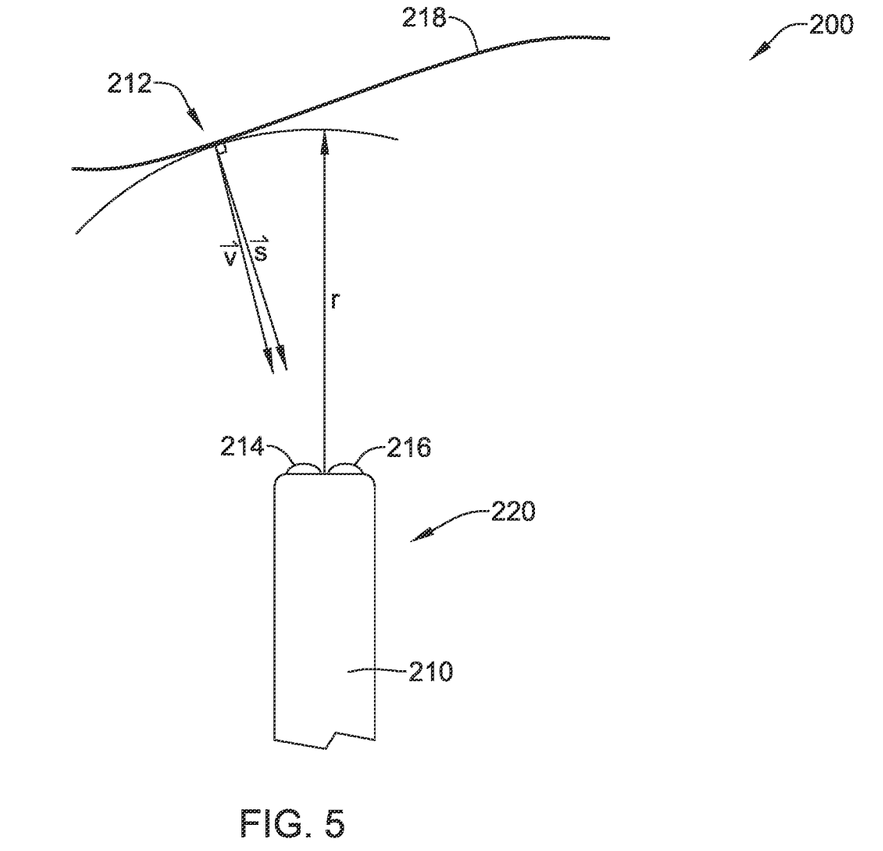
FIG. 5 is a schematic illustration of an example optical imaging system with an adjacent example light source illuminating a surface of an object.

FIG. 5 illustrates a schematic illustration 200 showing an example surface geometry of an object 218 (e.g., the inner surface of a body structure) being illuminated by a medical device 210. It can be appreciated that the medical device 210 may include an endoscope (such as the endoscope 10 described herein). Further, FIG. 5 illustrates that the distal end region 220 of the endoscope may include a digital camera 214 positioned next to a light source 216.

FIG. 5 further illustrates a single point 212 (of a plurality of surface points) along the inner surface of the body lumen 218, whereby the distance r represents the distance from the single point 212 to the camera 214 and light source 216. It can be appreciated that the angle between the surface normal S and the viewing axis $\vec{v}$ is minimized. It can be further appreciated that the single point 212 will have a local maximum image intensity, while an image obtained of the surface points may have one or more local maximum image intensities corresponding to one or more surface points.

It can be appreciated that the assumptions set forth above may lead to a simplified reflection model shown in the following relation:

$$I \propto LA \frac{\vec{v} \cdot \vec{S}}{r^4} \quad (1)$$

where I is the image intensity, L is illumination intensity, A is a surface albedo factor, $\vec{v}$ is the viewing vector (e.g., a vector from the surface point 212 on the body structure 218 to the camera 214), S is the surface normal (e.g., a vector normal to the surface point 212 on the body structure 218), and r is the distance from the camera 214 to the surface point 212.

Additionally, with A assumed constant, using an initial estimate for L (discussed in greater detail below) and assuming surface normal parallel to the viewing vector, a given intensity may yield an estimate for the distance r (e.g., the distance from the camera 214 to the single point 212). It can be further appreciated that the estimate for r may be effectively a maximal constraint, as relaxing the surface orientation assumption will only decrease the distance estimate. Additionally, requiring consistency between the distance imaged, the intensity and the surface orientation in equation (1) above, while introducing a smoothness assumption, may derive depth estimates from initial imaged points. Further, the calculated depth estimates may derive an estimated three-dimensional surface orientation of the imaged object. It can be further appreciated that an assumption of a concave scene may be assumed, in which the depth estimates may decrease with the angle from the scope axis.

Figure 6:
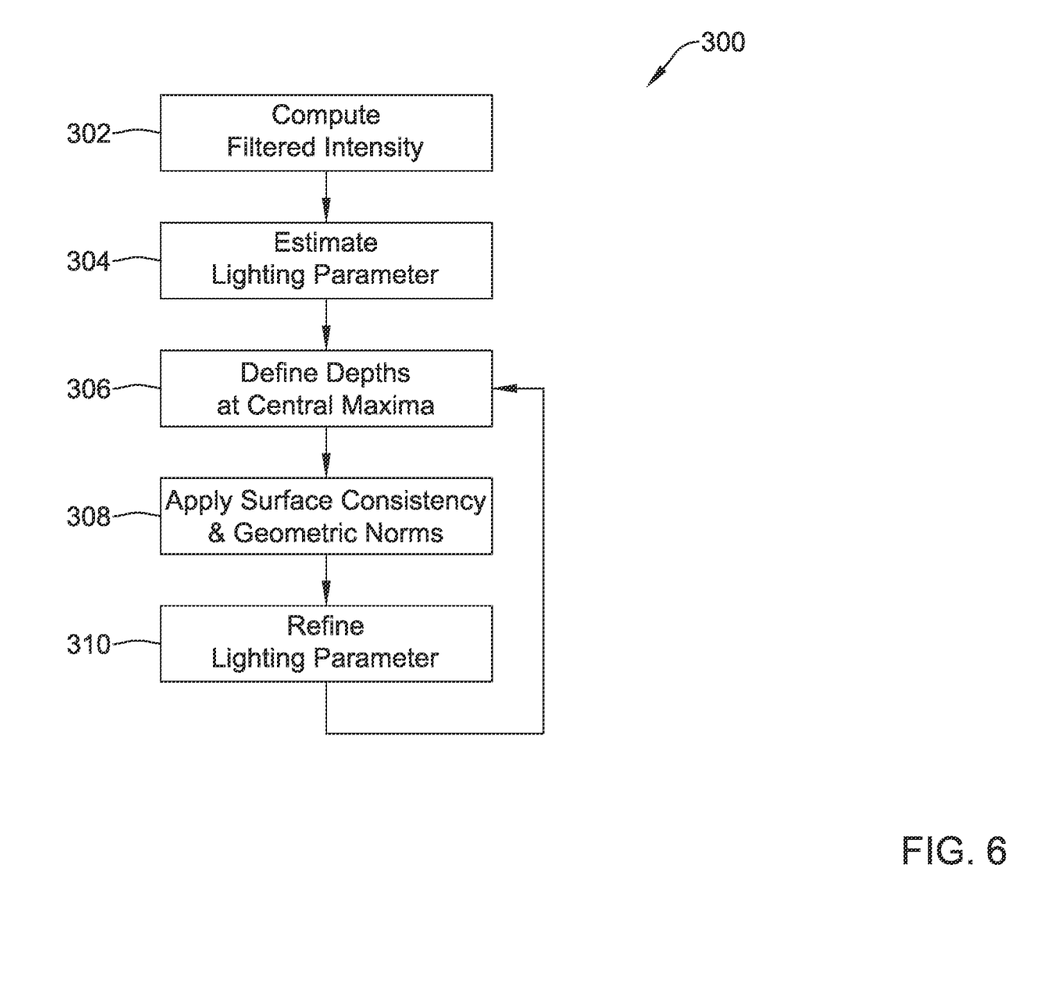
FIG. 6 is a block diagram of an image processing algorithm for estimating the distance of a surface of an object from a light source.

FIG. 6 illustrates an example process methodology 300 which includes beginning with a scalar image and computing 302 the filtered intensity, estimating 304 the lighting parameter, defining 306 the depths at any central maxima, applying 308 a surface consistency and geometric norms, which will result in depth estimates around and between the maxima, and finally refining 310 the lighting parameter. This methodology may derive estimates for the distances of imaged objects (potentially at each imaged pixel) from the camera (e.g., the camera 210) collecting the image.

The surface topology, lighting parameter, and albedo estimates are interdependent models of the patient imaging, each of which helps to inform the others. These models can be optimized together in an iterative process such as the above that refines one model at a time, then uses it to improve the estimate of the next model. This optimization cycle can be repeated multiple times for a given set of images, but the models can also be retained as a starting point for calculations on subsequent captured images.

Robust Surface Estimation

The techniques described above for inferring scene shape from digital imagery may generate a series of depth estimates from the camera 210 to the surface of a body structure over time, each of which is often subject to uncertainties, or varying levels of confidence. It can be appreciated that the overall imaged scene may be improved by collecting data from multiple techniques and/or integrating data over time from multiple images of the same scene. For example, Kalman filtering may provide a system for optimizing a depth estimate when combined with multiple measurements with varying uncertainties. However, a data representation may be required that permits efficient integration of multiple sets of measurements, with varying degrees of overlap and varying orientations. This type of data representation may also need to maintain appropriate information about past measurements while supporting rapid calculations of the three-dimensional surface meshes.

An example data representation that permits efficient integration of multiple sets of measurements, with varying degrees of overlap and varying orientations may include a tri-tessellated or quad-tessellated surface mesh which accumulates a composite texture map to incorporate image data from all measurements, whereby each mesh node includes:

1) a three-dimensional position (in a scalable, potentially unitless coordinate system);
2) a three-dimensional normal vector;
3) two-dimensional texture coordinates, or other surface color information; and
4) a three-dimensional uncertainty vector, whose direction indicates the direction of maximum uncertainty, and whose magnitude correlates with measurement uncertainty.

Additionally, the associated texture map, in addition to color information, may include an additional value for each pixel counting the number of color observations factored in that pixel. Further, the algorithm for combining new measurements may include a single gain parameter which controls the stability of the system in the presence of changing measurements.

An example update process would include as an input a color bitmap along with a three-dimensional surface mesh, a view origin (reflecting the camera position) and an uncertainty scalar. The uncertainty scalar may also be pre-divided by a confidence factor if the depth estimation provides independent measurements for error and confidence. A vector cast from the origin point through each node of the input mesh may be intersected with the model mesh, to determine whether the previously modeled surface lies within a range of the new measurement determined by adding the new measurement uncertainty to the uncertainty value in the previous mesh node which is closest to the viewing vector. If not, the mesh may be added, with each node getting an uncertainty vector equal to the normalized view vector multiplied by the uncertainty value. If the pre-existing mesh is within the uncertainty range of the new mesh, each node of the new mesh may intersect with a face of the model mesh, and is either associated with the closest node, if within a threshold distance, or added as a subdivision of the model face. The position of this node will then be set to a weighted average according to the following equations:

$$w_p = \frac{U_m}{U_m + |\vec{U}_p|}, w_m = \frac{|\vec{U}_p|}{U_m + |\vec{U}_p|}, \vec{p}' = w_p\vec{p} + w_m\vec{m}$$

Where $\vec{p}$ and $\vec{p}'$ are the previous and updated model node coordinates respectively, $U_m$ is the new measurement uncertainty, $\vec{U}_p$ is the model node uncertainty vector and $\vec{m}$ is the new measurement node coordinates.

The uncertainty is then updated according to:

$$|\vec{U}_p| = \frac{w_m \vec{U}_p + w_p \hat{v}}{w_p + w_m}\sqrt{U_m^2 + |\vec{U}_p|^2}$$

The corresponding texture pixels are similarly integrated according to the weighted averaging above, with each color component $c_p$ updated with:

$$c'_p = w_p c_p + w_m c_m$$

Where $c_m$, is the corresponding color component in the bitmap associated with the new measurement.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A method of estimating the distance of a body structure from a medical device, the method comprising:
   illuminating the body structure with a light source positioned on the distal end region of a medical device;
   capturing a first input image of the body structure with a digital camera positioned on the distal end region of the medical device;

representing the first image with a first plurality of pixels, wherein the first plurality of pixels includes one or more pixels displaying a local intensity maxima;

defining a first pixel group from the one or more pixels displaying a local intensity maxima, wherein the first pixel group corresponds to a plurality of surface points of the body structure;

wherein the first pixel group further includes a first image intensity; and calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:
I is an image intensity;
L is an illumination intensity;
A is a surface albedo factor;
$\vec{v}$ is a vector from the first surface point to the camera;
$\vec{S}$ is a vector normal to the first surface point.

2. The method of claim 1, further comprising calculating the relative distances from the digital camera to each of the surface points of the plurality of surface points.

3. The method of claim 2, further comprising calculating a refined surface albedo factor using the relative distances from the digital camera to each of the surface points and a pixel intensity average over pixels with a similar hue.

4. The method of claim 3, further comprising calculating refined relative distances from the digital camera to each of the surface points using the refined surface albedo factor.

5. The method of claim 4, wherein the refined distances and the refined surface albedo factor are constrained by a map of three-dimensional position uncertainty vectors derived from one or more registered frames.

6. The method of claim 5, further comprising calculating a second surface point position from a weighted average of the refined distance values, the refined surface albedo factor and a previous estimate of the second surface point position.

7. The method of claim 6, wherein the weighted average of the refined distance values, the refined surface albedo factor and the previous estimate of the second surface point position is inversely proportional to the magnitude of an uncertainty vector.

8. The method of claim 7, further comprising calculating an uncertainty vector $\vec{U}_p$, weighted averages and positions according to the relations:

$$w_p = \frac{U_m}{U_m + |\vec{U}_p|}, \ w_m = \frac{|\vec{U}_p|}{U_m + |\vec{U}_p|}, \ \vec{p}' = w_p \vec{p} + w_m \vec{m}$$

wherein:
$w_p$=a weighted average of previous distance values;
$w_m$=a weighted average of a new measurement node coordinate;
$\vec{p}$ =a previous model node coordinate;
$\vec{p}'$ =an updated model node coordinate;
$U_m$=a new model node uncertainty measurement;
$\vec{U}_p$ =a previous model node uncertainty vector; and
$\vec{m}$ =a new measurement node coordinate.

9. The method of claim 8, further comprising generating a surface texture map associated with the surface position map, wherein the surface texture map is generated using the relation:

$$|\vec{U}_p| = \frac{w_m \vec{T}_p + w_p \hat{v}}{w_p + w_m} \sqrt{U_m^2 + |\vec{U}_p|^2}.$$

10. A method of estimating the distance of a body structure from a medical device, the method comprising:
illuminating the body structure with a light source positioned on the distal end region of the medical device;
using a digital camera positioned on the distal end of region of the medical device to capture a first image of the body structure at a first time point, wherein the image capture device is positioned at a first position when it captures the first image at the first time point;
representing the first image with a first plurality of pixels, wherein the first plurality of pixels includes one or more pixels displaying a local intensity maxima;
defining a first pixel group from the one or more pixels displaying a local intensity maxima, wherein the first pixel group corresponds to a plurality of surface points of the body structure;
wherein the first pixel group further includes a first image intensity; and
calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:
I is an image intensity;
L is an illumination intensity;
A is a surface albedo factor;
$\vec{v}$ is a vector from the first surface point to the camera;
$\vec{S}$ is a vector normal to the first surface point.

11. The method of claim 10, further comprising calculating the relative distances from the digital camera to each of the surface points of the plurality of surface points.

12. The method of claim 11, further comprising calculating a refined surface albedo factor using the relative distances from the digital camera to each of the surface points and a pixel intensity average over pixels with a similar hue.

13. The method of claim 12, further comprising calculating refined relative distances from the digital camera to each of the surface points using the refined surface albedo factor.

14. The method of claim 13, wherein the refined distances and the refined surface albedo factor are constrained by a map of three-dimensional position uncertainty vectors derived from one or more registered frames.

15. The method of claim 14, further comprising calculating a second surface point position from a weighted average of the refined distance values, the refined surface albedo factor and a previous estimate of the second surface point position.

16. The method of claim 15, wherein the weighted average of the refined distance values, the refined surface albedo factor and the previous estimate of the second surface point position is inversely proportional to the magnitude of an uncertainty vector.

17. The method of claim 16, further comprising calculating an uncertainty vector $\vec{U}_{p\,p}$, weighted averages and positions according to the relations:

$$w_p = \frac{U_m}{U_m + |\vec{U}_p|}, w_m = \frac{|\vec{U}_p|}{U_m + |\vec{U}_p|}, \vec{p}' = w_p \vec{p} + w_m \vec{m}$$

wherein:

$w_p$ = a weighted average of previous distance values;

$w_m$ = a weighted average of a new measurement node coordinate;

$\vec{p}$ = a previous model node coordinate;

$\vec{p}'$ = an updated model node coordinate;

$U_m$ = a new model node uncertainty measurement;

$\vec{U}_p$ = a previous model node uncertainty vector; and $\vec{m}$ = a new measurement node coordinate.

18. The method of claim 16, further comprising generating a surface texture map associated with the surface position map, wherein the surface texture map is generated using the relation:

$$|\vec{U}_p| = \frac{w_m \hat{U}_p + w_p \hat{v}}{w_p + w_m} \sqrt{U_{m2} + |\vec{U}_p|^2}.$$

19. A system for estimating the distance of a body structure from a medical device, comprising:
a processor; and
a non-transitory computer-readable storage medium comprising code configured to perform a method for estimating the distance of a body structure from a medical device, the method comprising:
illuminating the body structure with a light source positioned on the distal end region of a medical device;
capturing a first input image of the body structure with a digital camera positioned on the distal end region of the medical device;
representing the first image with a first plurality of pixels, wherein the first plurality of pixels includes one or more pixels displaying a local intensity maxima;
defining a first pixel group from the one or more pixels displaying a local intensity maxima, wherein the first pixel group corresponds to a plurality of surface points of the body structure;
wherein the first pixel group further includes a first image intensity; and
calculating a relative distance r from the digital camera to a first surface point of the plurality of surface points by assuming $\vec{v}$ and $\vec{S}$ are parallel at the first surface point, that A is constant, and solving the relation for r:

$$I \propto LA \frac{\vec{v} \cdot \vec{S}}{r^4}$$

wherein:

I is an image intensity;

L is an illumination intensity;

A is a surface albedo factor;

$\vec{v}$ is a vector from the first surface point to the camera;

$\vec{S}$ is a vector normal to the first surface point.

20. The method of claim 19, further comprising calculating the relative distances from the digital camera to each of the surface points of the plurality of surface points.

* * * * *